United States Patent [19]

McCaughan et al.

[11] 3,757,119

[45] Sept. 4, 1973

[54] APPARATUS AND METHOD FOR DETERMINING SPUTTERING EFFICIENCY

[75] Inventors: Daniel Vincent McCaughan, Westfield; Douglas Leon Simms, East Orange; Norman Henry Tolk, Mendham; Clark Woody White, Dover, all of N.J.

[73] Assignee: Bell Telephone Laboratories, Incorporated, Murray Hill, N.J.

[22] Filed: Mar. 8, 1972

[21] Appl. No.: 232,772

[52] U.S. Cl ....... 250/304, 250/307, 250/395, 356/85
[51] Int. Cl. ............................................ H01j 37/00
[58] Field of Search ................... 250/49.5 P, 49.5 R; 356/85

[56] References Cited
UNITED STATES PATENTS 3,644,044  2/1972  Tolk et al. ..................... 250/49.5 P
3,415,985  12/1968  Castaing et al. ................ 250/49.5 P

OTHER PUBLICATIONS

"Method for Studing Sputtered Particles by Emission Spectroscopy" by Sawatzky and Kay Oct. 1966 Review Scientific Inst.

Primary Examiner—James C. Lawrence
Assistant Examiner—B. C. Anderson
Attorney—W. L. Keefauver et al.

[57] ABSTRACT

Efficiencies of sputtering of a material by bombardment with a particle beam are determined by: observing the time required for photon emissions characteristic of the particle sputtered from a film of known thickness of the material to disappear; or observing the time required for photon emissions characteristic of the substrate material to appear.

2 Claims, 2 Drawing Figures

PATENTED SEP 4 1973　　3,757,119

APPARATUS AND METHOD FOR DETERMINING SPUTTERING EFFICIENCY

BACKGROUND OF THE INVENTION

1. Field of the Invention

This invention relates to a method and apparatus for measuring sputtering efficiencies of materials by observing photon emissions characteristic of sputtered particles.

2. Prior Art

In the electronics field and in particular in the manufacture of integrated circuits and semiconductor devices, sputtering is widely used to deposit or remove critical amounts of material from the workpiece. The ability to monitor these sputtering processes is essential to the achievement of high yield manufacturing processes. Due in part to the influence of miniaturization, the amounts of material deposited or removed may often be so small as to render direct monitoring techniques such as thickness or weight measurements unsuitable. Knowing the sputtering efficiency and thus the sputtering rate for a material (sputtering rate is the product of beam intensity and sputtering efficiency), however, would enable a greater degree of control over the amount of the material deposited or removed. Presently available techniques for determining sputtering efficiencies include sputtering material onto a substrate and determining the weight change. However, relatively large amounts of material must generally be sputtered in order to obtain reliable results by this method. In addition, since the weighing is ordinarily carried out in air, the determination tends to be sensitive to the adsorption of gases by the sample.

Another method relies upon the degree of optical transmission through a sputtered layer. However, a relationship between thickness and optical transmission must first be obtained for the material, and such determinations tend to be tedious and time-consuming.

A third method relies upon the presence of a known quantity of radioactive tracer in the material to be sputtered. This method tends to be hazardous to the operator and in addition may cause contamination of the apparatus for an indefinite period.

A fourth method relies upon the ionization of sputtered atoms collected upon a hot electrode by the phenomenon known as surface ionization. However, this method is restricted primarily to alkali metals as the sputtered species, and also depends upon nearly complete collection by the electrode of the sputtered particles.

A fifth method relies upon mass spectrometric detection of the sputtered particles. This method tends to be tedious and cumbersome, in addition to which it is generally difficult to detect all of the sputtered particles.

A sixth method relies upon detection of the sputtered particles by optical spectroscopy. The target is located in a plasma, so that the sputtered atoms become excited by the plasma and emit characteristic photon spectra. While this method is in general either more sensitive or more convenient than any of the others, it nevertheless requires sputtering of significant amounts of material in order to obtain photon emissions whose intensities are clearly distinguishable from those of the plasma. Most significantly, however, this method is substantially incompatible with the use of neutral particle beams to sputter material, since it is difficult to control the energy and intensity of such beams in a plasma environment. It is highly desirable nevertheless to be able to determine the sputtering efficiency of neutral particle beams since such beams do not cause charge buildup upon semiconducting and insulating surfaces, as do ion beams. Such charge buildup by ion beams tends to change the energy and/or intensity of the beam at the point of impact upon the target, thus changing the sputtering efficiency and thus the amount of material deposited or removed. Thus, there continues to be a need for reliable and convenient methods for determining sputtering efficiencies for both ion and neutral particle beams on solids.

SUMMARY OF THE INVENTION

The efficiency of removal of a material by sputtering with either an ion or neutral particle beam of known mass, charge state, energy and intensity is determined by depositing a known thickness of a film of the material onto a known substrate material and sputtering off the film while observing photon emissions from the sputtered particles. Use of a beam having an energy above a critical value results in the sputtering of excited state particles directly from the surface of the film and consequent photon emissions characteristic of the sputtered particles. The time required for photon emissions characteristic of the film material to disappear or conversely, for photon emissions characteristic of the substrate material to appear indicates the sputtering rate. The relationship between sputtering efficiency and energy or intensity or angle of incidence of the particle beam for a particular material may readily by be simply by varying the energy or intensity or angle of incidence of the beam while changing the relative positions of the beam and the substrate so as to expose an unsputtered portion of the film to the beam for each new beam value.

The technique may also be used to monitor sputter cleaning of a surface by observing the declining intensities of photon emissions characteristic of surface contaminants.

Apparatus suitable for carrying out the technique includes a beam source, means for focusing and accelerating the beam to the desired energy level, and for directing the beam against the substrate, means for discriminating between photon emissions of different energies, means for detecting the intensity of these photon emissions, and means for maintaining a vacuum at least in the vicinity of the substrate.

DETAILED DESCRIPTION OF THE INVENTION

Figure 1:
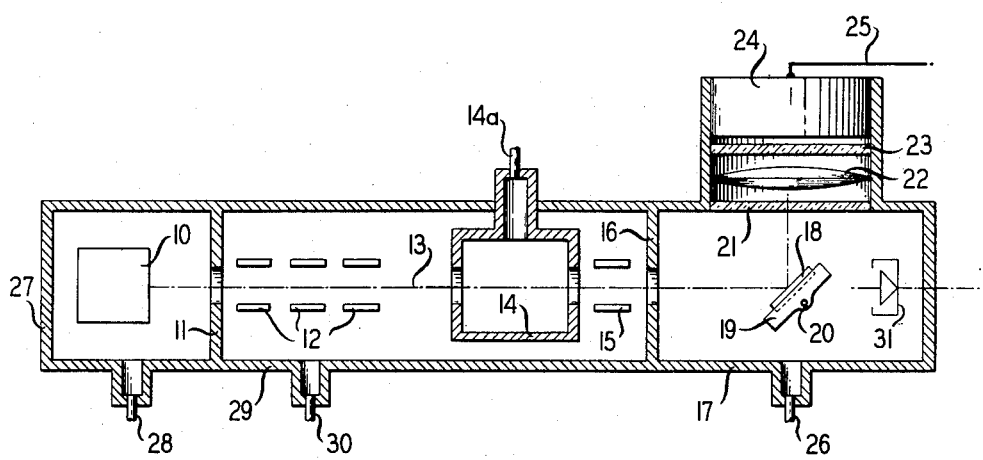
FIG. 1 is a sectional view of one embodiment of an apparatus of the invention.

Referring now to FIG. 1 there is shown one embodiment of the inventive apparatus in which ion source 10 provides ions, apertured partition 11 defines the ion beam 13, ion lenses 12 accelerate the ions to the proper energy while also focusing the beam 13 and directing the beam through charge exchange chamber 14 and deflector plates 15, and through apertured partition 16 into collision chamber 17 containing the sample 18 to be analyzed. The basic technique for analyzing solids by sputtering excited particles therefrom to produce photon emissions has been described in U. S. Pat. No. 3,644,044, issued Feb. 22, 1972, and in copending application Ser. No. 225,404, filed Feb. 11, 1972, both assigned to the present assignee. However to aid the practitioner, the basic features will be briefly described. Production of ions may be by any technique known in the art such as electron impact ionization.

Ion acceleration is critical to the obtaining of the collision-induced emissions. The acceleration step must in general produce ions having energies of at least three to five electron volts above the energy arrived at by the following equation:

$$E = E_s + ([m_1 + m_2]/m_2)E^* ,$$

where $E_s$ is the threshold energy for the sputtering of surface atoms in their electronic ground states, $E^*$ is the excitation energy of a specific excited state of the sputtered atom, $m_1$ is the mass of the incident ion or molecule, and $m_2$ is the mass of the sputtered atom.

Standard excitation energies $E^*$ are known, and are therefore not a necessary part of this description. They are obtainable, for example, in energy level tables published by the National Bureau of Standards. Likewise, threshold energies $E_s$ are known for a number of ionic species incident on a variety of surfaces, but in any event are readily determinable by simple experimentation.

The species chosen to collide with the sample surface must do so at a sufficient energy to sputter excited particles therefrom, and thus may be of any element except hydrogen, whose mass is in general insufficient to cause significant sputtering at low energies due to insufficient momentum transfers. It will ordinarily be preferred to choose relatively stable gases having substantial masses such as nitrogen and the rare gases, Ne, Ar, Kr, and Xe.

The charge exchange chamber 14 and deflecting plates 15 may be used, if desired, to form a neutral particle beam, wherein a portion of ion beam 13 is neutralized by charge exchange with a gas admitted to the chamber through port 14a, and the non-neutralized portion is deflected from the beam path by plates 15. A more detailed description of charge exchange may be found in copending U. S. Pat. application Ser. No. 225,404, filed Feb. 11, 1972, assigned to the present assignee, and is not a necessary part of this description. It is preferred to adjust the gas density so as to achieve a neutralization rate of 20 to 30 percent, below which the efficiency is too low to be practical, and above which the probability of secondary collisions is significant.

Collision chamber 17 may be evacuated through port 26, while chambers 27 and 29 are evacuated through ports 28 and 30. In general, a pressure in the chambers of $\sim 1 \times 10^{-3}$ Torr or less will be required, while a pressure of about $5 \times 10^{-6}$ Torr or less in the collision chamber is preferred, in order that the intensity of photon emissions from sources other than the sample surface be negligible in comparison to the spectral peaks of interest. These pressures are readily achieved by diffusion pumping. Liquid nitrogen trapped mercury diffusion pumping is, in general, preferred over oil diffusion pumping in order to minimize excessive hydrocarbon contamination.

Where a sample surface exhibits a conductivity value which is low enough to permit significant charge buildup on the surface and resultant repulsion of incoming ions, e.g., where the surface is insulating or semiconducting, charge buildup may be avoided by use of a neutral beam in place of the ion beam. However, where such charge buildup is not a problem, use of the ion beam may be preferred.

The sample 18 is secured within a recessed portion of sample support 19. The angular relation of the sample to beam 13 may be adjusted by pivoting support 19 about rod 20, so that the dependence of sputtering efficiency on the angle of incidence may be determined, if desired. Photon emissions resulting from sputtering of excited state particles from the sample 18 by beam 13 pass through quartz window 21 and are focused by quartz lens 22 through narrow band transmission filter 23 to photomultiplier tube 24. Signals produced by photon detection are carried by lead 25 to conventional signal processing equipment, not shown, where the counting rate is determined and registered. Faraday cup 31 may be used to measure ion beam intensity or neutral beam intensity by swinging sample support 19 out of the beam path. An alternate detector such as a bolometer may be employed at this position when neutral beams are produced by suitably adjusting gas pressure in chamber 14. A further alternative means for measuring the intensity of the neutral beam is described in copending U. S. Pat. application Ser. No. 232,864, filed Mar. 8, 1972, and assigned to the present assignee.

In practice a film or coating of the material whose sputtering rate is to be determined is deposited upon a substrate of a different material by any suitable technique such as vacuum evaporation, sputtering, electroplating, etc. The thickness of the film is preferably measured after formation, but may in certain cases be determined from the conditions of formation. It is preferred to achieve a film thickness as small as possible consistent with available thickness measuring techniques in that such minimum thicknesses reduces the time required for removal of the film by sputtering. Use of optical interference techniques, for example, can in some cases enable the measurement of film thicknesses less than a thousand Angstroms. A beam of known species, energy and intensity is then directed against the film and the resultant photon emissions characteristic of either the film or the substrate are monitored. The time required for photon emissions characteristic of the film material to disappear or conversely, the time required for photon emissions characteristic of the substrate to appear indicates sputtering rate for the material by the beam.

EXAMPLE

Figure 2:
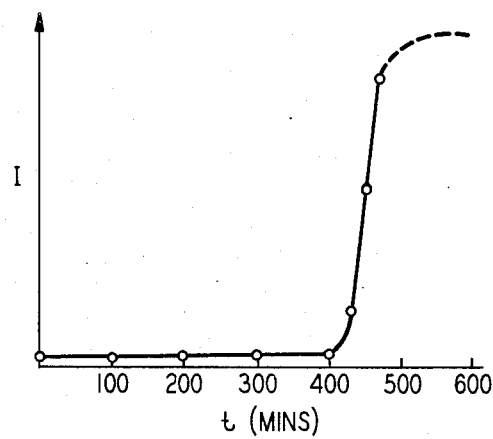
FIG. 2 is a graph of photon emission intensity versus sputtering time for an $N_2^-$ beam on an $Al_2O_3$ film on an $SiO_2$ substrate.

Using an apparatus similar to that shown in FIG. 1, sputtering rate for $Al_2O_3$ was determined as follows. A film of $Al_2O_3$ having a thickness of 500 A. was deposited on a silicon dioxide substrate and the substrate was placed in the sample chamber. The spectrometer was set to detect photon emissions at 2882 A., characteristic of silicon. The film was then bombarded with an $N_2^+$ ion beam at an energy of 3 kiloelectron volts, and intensity of $3 \times 10^{-7}$ amperes. Results are shown graphically in FIG. 2, in which intensity of photon emissions in arbitrary units is plotted versus sputtering time in minutes. As may be seen, after about 400 minutes, the silicon line began to appear; and after about 500 minutes, the peak intensity was reached. Thus, a sputtering rate of about 1 Angstrom per minute was indicated for the conditions given. From this rate, a sputtering efficiency of about two atoms per incident particle was determined.

This technique also provides a means for the real time monitoring of sputter cleaning a surface with either an ion or neutral particle beam by observing the declining intensities of photon emissions of the contaminants. Use of neutral particle beams for such sputter cleaning is preferred in electronic device manufacture over use of ion beams, since it avoids charge-buildup on insulating and semiconducting surfaces which would result in degradation of device operating characteristics.

What is claimed is:

1. A method for determining the efficiency of sputtering of a material by an ion or neutral particle beam comprising:

forming a film of known thickness of the material on a substrate;

producing collisions of the particle beam with the surface of the film at an energy sufficient to sputter excited state particles from the surface to produce photon emissions characteristic of the sputtered particles, and measuring the time required for the photon emissions to indicate removal of the film whereby the efficiency of sputtering of the film material by the beam is determined.

2. The method of claim 1 in which the time required for photon emissions characteristic of the substrate material to appear is measured.

* * * * *

UNITED STATES PATENT OFFICE
CERTIFICATE OF CORRECTION

Patent No. 3,757,119      Dated September 4, 1973

Inventor(s) Daniel V. McCaughan, Douglas L. Simms, Norman H. Tolk, Clark W. White It is certified that error appears in the above-identified patent and that said Letters Patent are hereby corrected as shown below:

Column 2, line 31, after "readily" delete "by", after "be" insert --determined--.

Column 2, line 54, change "$N_2^-$" to --$N_2^+$--.

Signed and sealed this 26th day of March 1974.

(SEAL)
Attest:

EDWARD M. FLETCHER, JR.
Attesting Officer

C. MARSHALL DANN
Commissioner of Patents